Jan. 30, 1962   J. M. WILLIS   3,018,821
CHAFER FOR TIRE BEAD AREA PROTECTION
Filed Nov. 24, 1958

INVENTOR.
JAMES M. WILLIS
BY W. A. Fraser
ATTY.

3,018,821
CHAFER FOR TIRE BEAD AREA PROTECTION
James M. Willis, Akron, Ohio, assignor to The Firestone Tire & Rubber Company, Akron, Ohio, a corporation of Ohio
Filed Nov. 24, 1958, Ser. No. 776,004
1 Claim. (Cl. 156—135)

This invention relates to the bead of a pneumatic tire and more particularly to the chafer element protecting such a bead and a method for manufacturing such a chafer element.

A pneumatic tire relies for stability on two annular metal bead portions covered by the rubber insulated fabric of the tire body and designed for mounting the tire on the rim of the wheel of the vehicle. The practice has been to use the fabric plies of the body of the tire turned alternately up and down around each of the metal beads to secure the tire body to the beads, the turned-up body fabric covered with a rubberized fabric chafer strip to protect the beads from the rim flange of the wheel. Difficulty is encountered with this construction in that the rubber on the chafer strip is displaced during vulcanization and subsequent wheel rotation causes the wheel rim flange to rub against the exposed fabric in the bead area of the tire to produce scuffing, abrasion, and cutting. As the fabric slowly deteriorates from this action, sand and grit work between the fabric plies to cause ply separation with resulting tire failure. It also has been proposed to protect the tire bead from the rim flange by the use of a rigid rubber strip over the body plies in the bead area of the tire. Difficulties have been encountered in using such a rubber strip in that the rubber squeezes out of position during vulcanization of the tire in a mold to expose the body fabric in the area between the heel of the bead and the sidewall of the tire at a place where the greatest protection from the rim flange is required. The fabric of the body thus denuded of the rubber coating is unsatisfactory protection to the bead from the rubbing of the rim, since fabric alone has little chafe resistance.

This application is a continuation-in-part of my co-pending application, Serial No. 474,547.

The present invention overcomes the failings of the prior art chafer by providing a rubbery insulating material which may be used on either a fabric strip as a coating or as a rigid rubbery chafer element which will not flow during vulcanization of the tire. This material is comprised of a rubbery stock having a high loading of silica and in some modifications of the invention of a rubbery stock in which the high loading of silica is incorporated in the rubber in an unusual manner.

It is, therefore, an object of this invention to provide means for protecting the bead portion of a pneumatic tire from the chafing action of a rim on which the tire is mounted. It is also an object of this invention to provide a tire bead construction protected by a fabric strip coated with a rubbery material resistant to displacement during tire vulcanization.

Another object of this invention is to provide a rubber chafer having a high loading of silica which will resist flow during vulcanization of the tire.

A further object of the invention is to provide a rubber insulation for a fabric chafer strip having a high loading of silica.

Another object of the invention is to provide means to maintain a rubber element in position in the chafing area of a tire during vulcanization.

These and other objects of the invention will be apparent by reference to the specification, claim and drawings of which:

Figure 1:
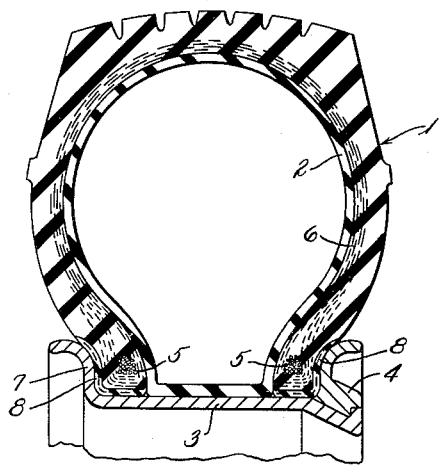
FIGURE 1 is a sectional view of a tire in accordance with the invention mounted on a rim.

In reference to FIGURE 1 a pneumatic truck tire generally indicated at 1 containing a tube 2 is held against axial movement on a tire rim 3 by locking ring 4. Tire 1 is provided at its marginal edges with annular metallic bead elements 5 held to the tire body by the upturned edges of fabric plies 6. It is desirable that plies 6 be protected from rubbing of the rim flange 7 and the locking ring 4 by chafers 8. Abrasion occurs during rotation of the wheel during which slight play and axial rocking of the tire bead rubs the outer surface of the bead against the rim flange 7 and the side ring 4. This continued abrasion rubs through the fabric to cause damage to the tire.

Figure 2:
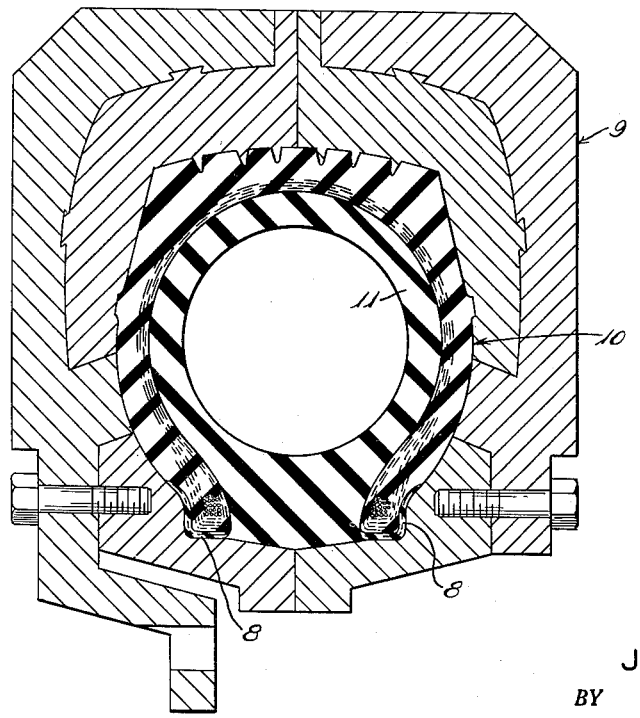
FIGURE 2 is a sectional view of a steam-heated tire vulcanizing mold enclosing a tire mounted on a water bag illustrating the position of the novel chafer during vulcanization of the tire.

FIGURE 2 shows a tire vulcanizing mold 9 of the steam heated type containing unvulcanized tire 10 which encloses a water bag 11. During vulcanization of the tire pressures on the order of 175 lbs. per square inch are exerted outwardly against the inner walls of the water bag. These pressures combined with the heat of vulcanization which reaches a temperature as high as 375° F. soften the rubber and force it away from the bead portion to expose the chafer fabric. This flow of rubber occurs because the shoulder of mold 9 adjacent to chafer 8 of the bead abuts into the surface contour of the tire with the result that when heat and pressure are applied within the water bag the chafer rubber normally is softened and forced away from the chafer fabric adjacent said mold shoulders.

Figure 3:
FIGURE 3 is a sectional view of a tire bead of the prior art after vulcanization illustrating the position of the chafer.
Figure 4:
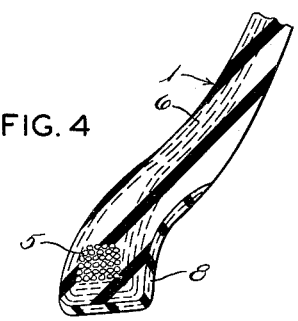
FIGURE 4 is a sectional view of a tire bead after vulcanization illustrating the position of the novel chafer.

Prior to this invention the tires when removed from the mold after the vulcanizing operation had a bead shape as shown in FIGURE 3 wherein chafer fabric 20 is exposed or only lightly covered with rubber as shown at 21. However, with the novel chafer 8 which is resistant to flow during vulcanization the chafer fabric is not laid bare and the desired protective cover remains on the fabric as shown at 8 in FIGURE 4.

In the present invention, a rubber chafer which resists flow during vulcanization of the tire is obtained by mixing large quantities of silica with natural or synthetic rubber as well as other materials. It has been found that for some reason, perhaps because of its structure, high loadings of silica provide a stock which does not flow under pressure at vulcanizing temperature whereas the prior art chafer stocks using carbon black and other standard loading materials are unsatisfactory for this purpose. A rubbery chafer stock of the invention is shown in the following formula, all parts being based on 100 parts of rubber hydrocarbon by weight:

*Example I*

| | |
|---|---:|
| Natural rubber | 100 |
| Hi Sil [1] | 60–110 |
| Carbon black | 33 |
| Zinc oxide | 5 |
| Stearic acid | 3 |
| Pine tar | 2 |
| Dipropylene glycol | 1.5 |
| Antioxidant | 1.5 |
| Sulfur | 3.1 |
| Accelerator | 2.1 |

[1] Hi Sil is a registered trademark for finely divided hydrated $SiO_2$ manufactured and sold by the Columbia Southern Chemical Company, Barberton, Ohio.

The materials shown in Example I were mixed to acquire the dispersion of the pigments in the rubber, and calendered onto a sheet of square woven fabric which was in turn slit into strips to provide a chafer element for a tire. The chafer element was built into the tire at positions shown at 8 in FIGURES 1 and 2, the tire was vulcanized and little or no rubber was displaced from the fabric chafer strip.

In the preferred form of the invention the rubber stock of Example I is mixed by preparing a series of masterbatches. The first masterbatch has the following formula:

| | |
|---|---:|
| Natural rubber | 100 |
| Hi Sil | 30 |
| Zinc oxide | 5 |
| Stearic acid | 3 |
| Pine tar | 2 |
| Dipropylene glycol | 1.5 |
| Antioxidant | 1.5 |
| Masterbatch #1 | 143 |

The listed ingredients were mixed for seven minutes in a Banbury mixer having a rotor speed of 30 r.p.m. and the mixed rubbery batch dropped from the mixing chamber when the temperature reached 255° F. This batch was allowed to cool and then charged into another Banbury mixer with the following formula:

| | |
|---|---:|
| Masterbatch #1 | 143 |
| Hi Sil | 35 |
| Masterbatch #2 | 178 |

This formula was mixed in the same Banbury mixer as masterbatch #2 for about four minutes and dropped from the mixing chamber when the temperature in the chamber reached 250° F.

This batch was allowed to cool and then charged in a Banbury mixer with the following ingredients:

| | |
|---|---:|
| Masterbatch #2 | 173 |
| Carbon black | 33 |
| Sulfur | 3.1 |
| Accelerator | 2.1 |
| Final stock | 211.2 |

This formula was mixed in about 1½ minutes and dropped from the mixing chamber when the temperature of the batch reached 225° F. If additional silica above 65 parts is added, the balance of the silica is put into the final mix with the sulfur and accelerator. The final stock was calendered onto a fabric chafer strip to form a rubbery coating and the strip was built into a tire in the position shown in FIGURE 2. The tire was vulcanized and the rubber retained its position in the chafer area without displacement.

The use of a Williams Plastometer for determining the viscosity of rubbery materials as described on page 389 of The Vanderbilt Rubber Handbook for 1948 demonstrates the advantage of the novel chafer stock over the prior art. The following table compares the novel rubbery chafer material with the prior rubbery material:

| | Williams Y3/ 212° F., mm. | Flow under Pressure and Heat of Tire Vulcanization |
|---|---|---|
| Novel Rubber Chafer | 8.5 | None. |
| Prior Art Rubber Stocks | 3.8 | Considerable. |

The Williams plasticity Y-3 value is a direct measure of the thickness of a standard sample under a standard 5 kilogram load at 212° F. and is an indication of the viscosity of the stock at elevated temperatures and thereby of the ability of the novel stock to remain in position in the bead area as a protective coat during vulcanization of the tire.

Among the rubbery materials useful in the invention are natural rubber and synthetic rubber including rubbery copolymers of butadiene and styrene, butadiene and acrylonitrile, isobutylene and isoprene, as well as rubbery polymers of chlorobutadiene and other rubbery polymers and copolymers available to those working in the rubber art.

For the rubbery materials used in the invention many accelerators are known to the art. Among those available are the thiazoles, the dithiocarbamates, the thiuram sulfides, for example, benzothiazole disulfide, mercaptobenzothiazole, cyclohexylbenzothiazole sulfenamide and zinc dimethyl dithiocarbamate. Magnesium oxide among others is useful for accelerating the polychloro-butadiene types of polymers. Also available are the aldehydeamine and guanidine type accelerators such as formaldehyde ammonia and diphenylguanidine, and many more known to those versed in the art of rubber compounding.

Although all types of carbon black are usable in the invention, abrasion resisting blacks such as easy processing channel, high abrasion furnace, and super abrasion furnace blacks as well as others well known to those skilled in the art are preferred.

What is claimed is:

A method of providing chafer elements on a tire comprising incorporating from 60 to 110 parts by weight of silica into 100 parts by weight of rubber by the steps of mixing in an internal mixer at least 30 parts by weight of said silica with said 100 parts by weight of rubber to produce a first rubber batch, allowing said first batch to cool, mixing in an internal mixer at least 30 additional parts by weight of said silica with said first batch to form a second batch, allowing said second batch to cool, mixing in an internal mixer the balance of said silica, if any, with said second batch together with vulcanizing ingredients to form a third batch, allowing said third batch to cool, forming said third batch into thin strips and applying as a chafer element one of said strips to each of the bead areas of an unvulcanized tire, and vulcanizing said tire.

References Cited in the file of this patent

UNITED STATES PATENTS

| | | |
|---|---|---|
| 2,668,789 | Phreaner | Feb. 9, 1954 |
| 2,727,876 | Iler | Dec. 20, 1955 |
| 2,760,894 | Wolf | Aug. 28, 1956 |
| 2,822,026 | Willis | Feb. 4, 1958 |